Nov. 29, 1955  J. B. McMAHON  2,724,962
APPARATUS FOR MEASURING THE DENSITY OF A GAS
Original Filed Jan. 21, 1948
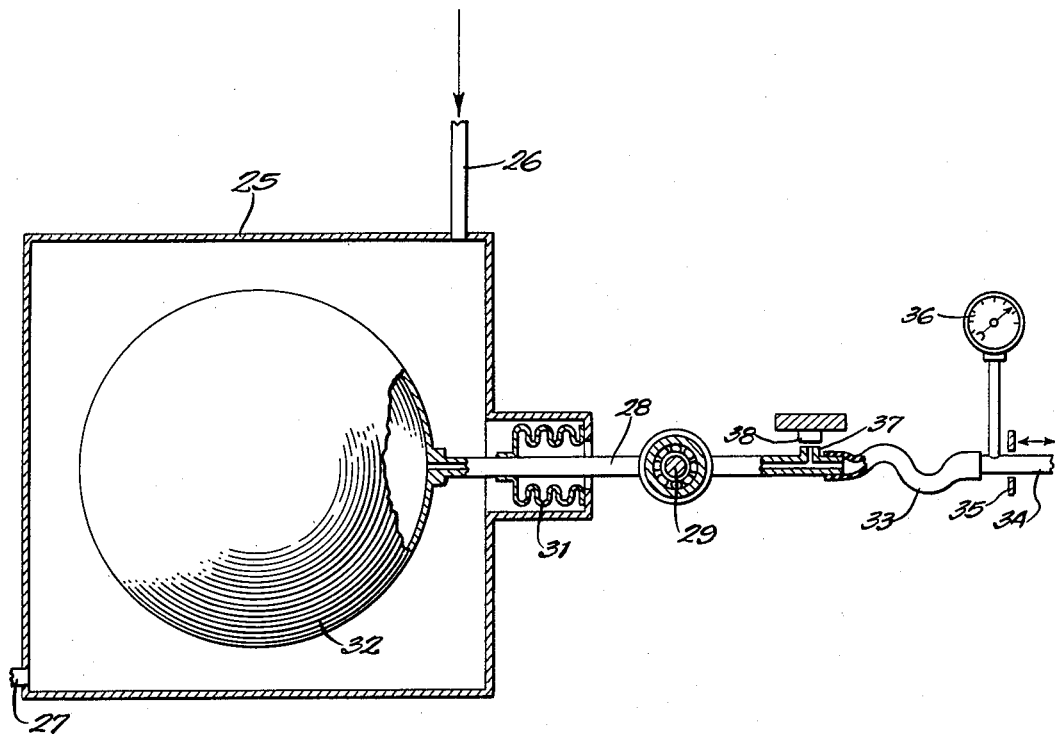
INVENTOR:
Jerome B. McMahon,
BY
Bair, Freeman & Molinare
ATTORNEYS.

United States Patent Office 2,724,962
Patented Nov. 29, 1955

2,724,962

APPARATUS FOR MEASURING THE DENSITY OF A GAS

Jerome B. McMahon, Wilmette, Ill., assignor to Republic Flow Meters Company, Chicago, Ill., a corporation of Illinois Original application January 21, 1948, Serial No. 3,485, Now Patent No. 2,662,394, dated December 15, 1953. Divided and this application August 5, 1953, Serial No. 372,555

4 Claims. (Cl. 73—30)

This invention relates to apparatus for measuring the density of a gas and more particularly to apparatus for continuously measuring changes in gas density due to either changes in its composition or in its pressure.

For many purposes in industrial processes and the like it is desirable to have a continuous indication of the density of a gas regardless of whether the changes in density are due to changes in composition or to changes in pressure. It is one of the objects of the present invention to provide an apparatus which will continuously and accurately measure changes in density of a gas.

Another object is to provide apparatus for measuring the density of a gas in which a displacer suspended in the gas to be measured is balanced against a standard gas and the pressure of the standard gas is controlled in response to the condition of balance. In one construction, according to the present invention, a single displacer may be suspended in one gas and filled with the other. In this construction the pressure of the standard gas becomes an accurate measure of the density of the gas sample.

The above and other objects and advantages of the invention will be more readily apparent when read in connection with the accompanying drawing, in which the single figure is a diagrammatic view of one form of apparatus embodying the invention.

The drawing illustrates a construction embodying the invention which comprises a hollow casing 25 defining a chamber through which a sample of the gas to be measured is circulated by means of conduits 26 and 27. A hollow pivoted balance beam 28 pivoted at 29 extends into the chamber through a flexible seal 31 and carries a hollow displacer 32 within the chamber and which defines a second chamber. The beam communicates with the chamber at the interior of the displacer, as shown, and is connected through a flexible hose 33 to a source of a standard gas indicated at 34. A restriction 35 is placed in the conduit 34 and the conduit may be connected to an indicating, recording or control device shown generally as a pressure gauge 36.

The pressure of the standard gas in the displacer is controlled by an orifice 37 connected to the hollow beam and movable toward and away from a fixed anvil 38.

In operation, the sample of gas to be measured is circulated through the chamber and the pressure of the standard sample, such as air, in the displacer is controlled so that the beam will balance. Upon a change in density of the sample, the beam will rock toward or away from the anvil to increase or decrease the pressure of the standard sample until the beam is rebalanced, and in this way the pressure of the standard sample becomes an accurate measure of the density of the gas to be measured.

In this construction it will be apparent that the pressure of the standard sample could be maintained either above or below atmospheric depending upon the range of density of the gas to be measured. The construction has been shown such that it will maintain the standard gas at a super-atmospheric pressure. It will be apparent, however, that by connecting the nozzle to a source of vacuum and reversing the relationship between the nozzle and balance beam a sub-atmospheric pressure could be maintained. This construction would be useful, for example, in measuring the density of gas samples which are less dense than air.

This application is a division of my co-pending application Serial No. 3485, filed January 21, 1948, now Patent No. 2,662,394.

While one embodiment of the invention has been shown and described in detail herein, it will be understood that this is illustrative only and is not to be taken as a definition of the scope of the invention, reference being had for this purpose to the appended claims.

What is claimed is:

1. Apparatus for measuring the density of a gas comprising a chamber, means to circulate a sample of gas to be measured through the chamber, a hollow displacer in the chamber in buoyant relation with the gas therein adapted to contain a standard gas, a pivoted balance beam carrying the displacer, means to supply the standard gas under pressure to the displacer, control means in the last named means operatively connected to and responsive to movement of the balance beam to control the pressure of the standard gas in the displacer, and indicating means responsive to the pressure of the standard gas.

2. Apparatus for measuring the density of a gas comprising a chamber, means to circulate a sample of gas to be measured through the chamber, a hollow displacer in the chamber in buoyant relation with the gas therein, a pivoted balance beam carrying the displacer, a connection including a passage through the balance beam to vary the pressure of a standard gas in the displacer, control means in the connection responsive to movement of the balance beam to control the pressure of the standard gas, and indicating means responsive to the pressure of the standard gas.

3. Apparatus for measuring the density of a gas comprising a chamber, connections to the chamber to circulate the gas to be measured therethrough, a hollow displacer in the chamber in buoyant relation with the gas therein means mounting the displacer in the chamber for vertical movement therein, a connection to the displacer to supply a standard gas thereto, control means in the connection responsive to movement of the displacer to control the pressure of the standard gas, and indicating means responsive to the pressure of the standard gas.

4. Apparatus for measuring the density of a gas comprising a casing defining a first chamber adapted to contain a first gas, means to supply the first gas to the first chamber, a hollow displacer defining a second chamber disposed in the first chamber and adapted to contain a second gas, means to supply the second gas to the second chamber, one of the gases being a gas whose density is to be measured and the other being a standard gas, a movable supporting member carrying the displacer, control means in the means to supply the standard gas to vary the pressure of the standard gas, the control means including a part connected to the movable supporting member to vary the pressure of the standard gas in response to movement of the supporting member, and indicating means responsive to the pressure of the standard gas.

References Cited in the file of this patent

UNITED STATES PATENTS 2,459,542    Rosenberger _____ Jan. 18, 1949

FOREIGN PATENTS 64,529    Germany _____ Sept. 15, 1892